United States Patent [19]

Jungbluth et al.

[11] 4,318,246
[45] Mar. 9, 1982

[54] MEANS FOR SECURING A TREE TO GROUND STAKES

[76] Inventors: Evan D. Jungbluth, 3062 S. 42nd St., Omaha, Nebr. 68105; Francesco Fuccio, 1613 N. 84th St., Omaha, Nebr. 68114

[21] Appl. No.: 128,448

[22] Filed: Mar. 10, 1980

[51] Int. Cl.³ ............................................. A01G 17/06
[52] U.S. Cl. ...................................................... 47/42
[58] Field of Search ..................... 47/42, 43, 44, 47; 272/61, 285, 112, 113; 119/46, 109, 118, 121, 122, 123; 24/141; 16/2; 52/146; 248/499

[56] References Cited

U.S. PATENT DOCUMENTS

| 383,824 | 5/1888 | Newell et al. ........................ 47/23 |
| 1,887,491 | 11/1932 | Johnson ............................. 119/109 |
| 1,976,776 | 10/1934 | Gookin ............................. 24/141 X |
| 2,296,217 | 9/1942 | Maloney ........................... 47/43 X |
| 3,521,401 | 7/1970 | Shisler ............................... 47/43 |
| 3,683,844 | 8/1972 | Wilkin ............................. 24/141 X |

FOREIGN PATENT DOCUMENTS

| 741057 | 8/1966 | Canada ................................... 24/141 |
| 9078 | of 1896 | United Kingdom ................... 47/44 |
| 107 | of 1910 | United Kingdom ................... 47/43 |
| 688846 | 3/1953 | United Kingdom ................... 47/44 |

*Primary Examiner*—James R. Feyrer
*Attorney, Agent, or Firm*—Zarley, McKee, Thomte, Voorhees & Sease

[57] ABSTRACT

An apparatus for securing a tree to ground stakes is described and comprises an elongated flat flexible member having opposite ends which are adapted to be positioned adjacent each other when the flexible member is extended around a portion of the tree. The opposite ends of the flexible member have openings formed therein adapted to receive a supporting wire extending therefrom to a ground stake. At least a pair of connector members are selectively slidably mounted on the flexible member and are adapted to have one end of a supporting wire secured thereto extending from a ground stake.

2 Claims, 3 Drawing Figures

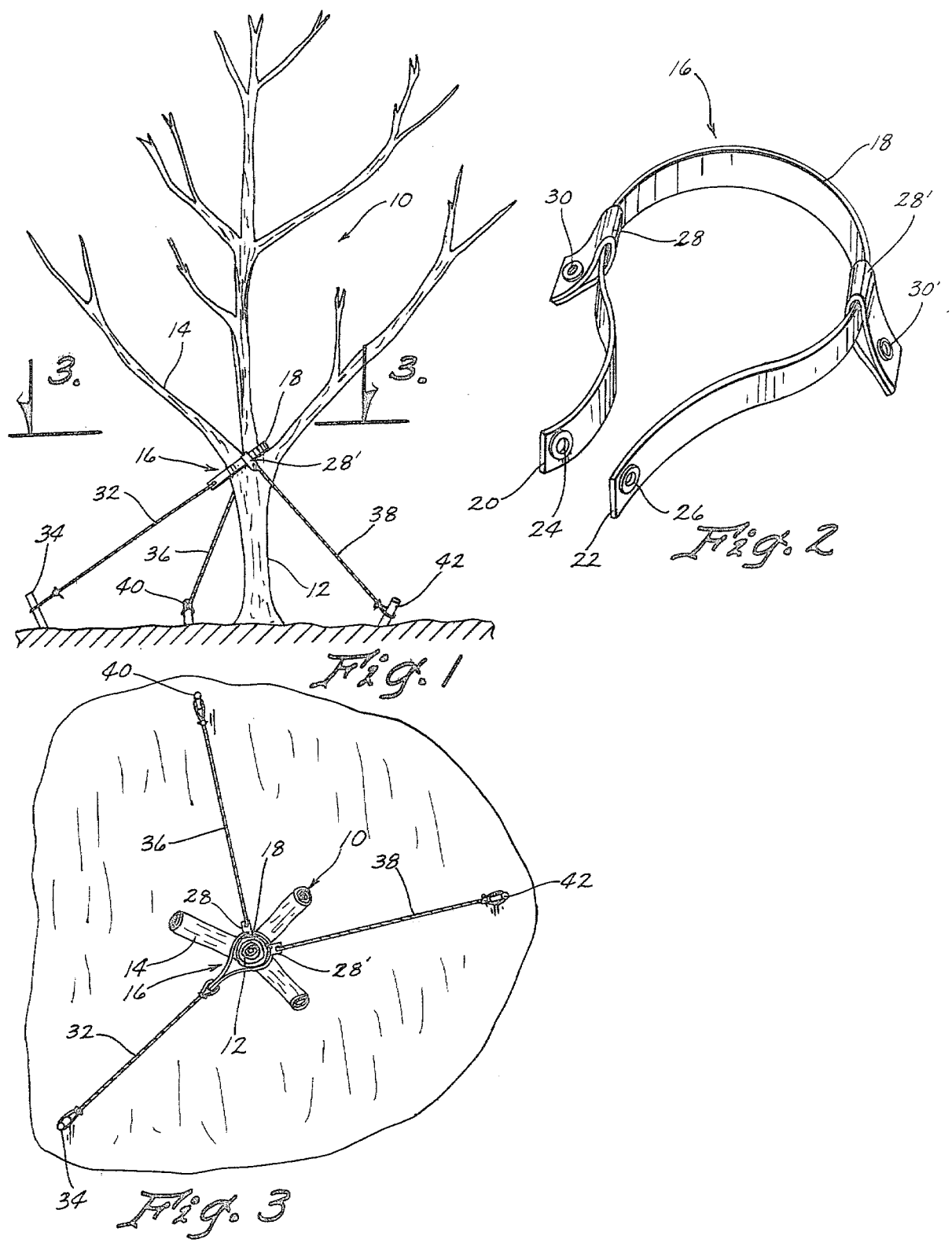

MEANS FOR SECURING A TREE TO GROUND STAKES

BACKGROUND OF THE INVENTION

This invention relates to a means for securing a tree to ground stakes and more particularly to an improved apparatus for securing a tree to ground stakes.

Young or transplanted trees normally require some form of supporting system. A common method of supporting such a tree is to take a plurality of short lengths of garden hose or the like and extend a supporting wire through the hose with the hoses then being wrapped around portion of the tree. Such a method of supporting the tree requires at least three lengths of hose which has become extremely expensive. A further disadvantage with the use of the lengths of garden hose is that the wire positioned therein tends to create undue pressure on the tree which can seriously stunt the growth of the tree.

Therefore, it is a principal object of the invention to provide an improved means for supporting a tree.

A still further object of the invention is to provide a means for securing a tree to ground stakes wherein a pair of connector members are slidably mounted on an elongated flexible member so that the connector members may be selectively positioned so as to avoid branches or the like.

A still further object of the invention is to provide a means for securing a tree to ground stakes which is economical to manufacture and durable in use.

A still further object of the invention is to provide a means for securing a tree to ground stakes which is refined in appearance.

These and other objects will be apparent to those skilled in the art.

BRIEF DESCRIPTION OF THE DRAWINGS

FIG. 1 is a side view illustrating the apparatus of this invention being used to support a tree;

FIG. 2 is a perspective view of the apparatus of this invention; and

FIG. 3 is a sectional view seen on lines 3—3 of FIG. 1.

SUMMARY OF THE INVENTION

A means for securing a tree to ground stakes is disclosed comprising an elongated flat flexible member having grommets positioned in its opposite ends for receiving a first supporting wire therein when the flexible member is wrapped around a portion of the tree. At least a pair of U-shaped connector members are mounted on the flexible member in such a manner so that the connector members may be adjustably moved to avoid branches on the tree. The ends of the connector members have grommets positioned therein for receiving supporting wires therein.

DESCRIPTION OF THE PREFERRED EMBODIMENT

Referring to the drawings, the numeral 10 designates a conventional tree including a trunk 12 and branches 14. The apparatus of this invention is referred to generally by the reference numeral 16 and is best illustrated in FIG. 2.

Apparatus 16 comprises a flat flexible member 18 comprised of a suitable nylon or strap material. The ends 20 and 22 of the flexible member 18 are provided with grommets 25 and 26 mounted therein respectively. A pair of U-shaped connector members 28 and 28' are selectively slidably mounted on the flexible member 18 between the ends thereof as seen in FIG. 2. The ends of each of the connector members are positioned adjacent each other and grommets 30 and 30' are mounted therein.

In use, the flexible member 18 is extended around a portion of the tree such as illustrated in FIGS. 1 and 3. A supporting wire 32 is extended through grommets 24 and 26 and is attached to a ground stake 34. Connector members 28 and 28' are then moved relative to flexible member 18 to avoid branches on the tree and so that a three-point supporting arrangement will be provided as best seen in FIG. 3. Supporting wires 36 and 38 are extended through grommets 30 and 30' respectively and are secured to ground stakes 40 and 42 respectively.

Thus it can be seen that the flexible member 18 may be conveniently extended around a portion of the tree and that the connector members may be positioned so as to avoid branches or the like to provide the proper support for the tree. The flat nature of the flexible member 18 prevents undue pressure from being exerted on the tree by the flexible member to avoid any stunting of the growth of the tree.

Thus it can be seen that the apparatus of this invention accomplishes at least all its stated objectives.

We claim:

1. A means for securing a tree to ground stakes positioned around the tree, comprising, an elongated flat flexible member having opposite ends, said flexible member adapted to extend around the tree so that its opposite ends are positioned adjacent each other, a first supporting wire means having one end secured to the adjacent opposite ends of said flexible member and its other end secured to one of the ground stakes, at least two first and second connector members longitudinally slidably embracing said flexible member between the ends thereof, a second supporting wire means secured at one end to said first connector member and its other end secured to one of the ground stakes, and a third supporting wire means secured at one end to said second connector member and its other end secured to one of the ground stakes.

2. The means of claim 1 wherein each of said connector members comprises a flexible U-shaped member, having opposite ends, which embraces and extends around said flat flexible member so that its opposite ends are positioned adjacent each other, and a grommet securing together the opposite ends of each of said connector members, each of said second and third supporting wire means being secured to one of said grommets.

* * * * *